(12) United States Patent  
Kunkel (10) Patent No.: US 7,605,554 B2
(45) Date of Patent: Oct. 20, 2009

(54) ANTI-PINCH WINDOW CONTROL SYSTEM (75) Inventor: Joseph Kunkel, Encinitas, CA (US)

(73) Assignee: DEI Headquartes, Inc., Vista, CA (US)

( * ) Notice: Subject to any disclaimer, the term of this patent is extended or adjusted under 35 U.S.C. 154(b) by 72 days.

(21) Appl. No.: 11/595,520

(22) Filed: Nov. 9, 2006

(65) Prior Publication Data

US 2008/0111509 A1 May 15, 2008

(51) Int. Cl.
E05F 15/16 (2006.01)
(52) U.S. Cl. .................. 318/286; 318/434; 318/469; 318/484
(58) Field of Classification Search ......... 318/264–266, 318/280, 286, 430–434, 466–470, 484, 626
See application file for complete search history.

(56) References Cited

U.S. PATENT DOCUMENTS

| 3,891,909 | A | * | 6/1975 | Newson | 318/469 |
| 4,131,831 | A | * | 12/1978 | Bochenek et al. | 318/282 |
| 4,272,708 | A | * | 6/1981 | Carle et al. | 318/266 |
| 4,286,303 | A | * | 8/1981 | Genheimer et al. | 361/24 |
| 4,725,765 | A | * | 2/1988 | Miller | 318/434 |
| 4,771,218 | A | * | 9/1988 | McGee | 318/16 |
| 4,864,201 | A | * | 9/1989 | Bernot | 318/480 |
| 4,900,994 | A | * | 2/1990 | Mizuta | 318/283 |
| 5,012,168 | A | * | 4/1991 | Dara et al. | 318/434 |
| 5,543,692 | A | * | 8/1996 | Howie et al. | 318/282 |
| 5,723,959 | A | * | 3/1998 | Iwata et al. | 318/447 |
| 6,051,945 | A |   | 4/2000 | Furukawa | |
| 6,118,243 | A | * | 9/2000 | Reed et al. | 318/468 |
| 6,452,353 | B1 | * | 9/2002 | Calamatas | 318/466 |
| 6,580,241 | B1 |   | 6/2003 | Sugawara | |
| 6,753,669 | B2 | * | 6/2004 | Spreng et al. | 318/469 |
| 6,936,984 | B2 |   | 8/2005 | Wilson | |

* cited by examiner

Primary Examiner—Bentsu Ro
(74) Attorney, Agent, or Firm—KC Bean, Esq.

(57) ABSTRACT

Methods are provided for detecting and alleviating the pinching of an object in a window of a vehicle having a drive unit motor controlling a window based upon current signals received from a control switch, security system remote control, or security system controller. The detection method includes determining a current threshold for the motor, determining time required to close the window, monitoring drive unit motor current draw during a window close operation, and determining if the current threshold is reached before window close time has elapsed. The alleviation method includes determining a current threshold, determining window close time, monitoring drive unit motor current draw during a window close operation, determining if current threshold has been reached before window close time has elapsed, and positioning the window so the drive unit motor current is less than the current threshold. The methods can be programmed into a window control module.

35 Claims, 5 Drawing Sheets

ANTI-PINCH WINDOW CONTROL SYSTEM

FIELD OF THE INVENTION

The embodiments of the present invention relate generally to automotive systems, and, more particularly, to automotive window control systems.

BACKGROUND

Many vehicles have power window systems. These systems provide for the power driven opening and closing of a vehicle window in response to the activation of a window control switch. Normally, when the window control switch is activated the window travels to either a fully closed position, a fully open position, or a "vent" position. Occasionally, when causing the window to travel to a fully closed position, the window may encounter resistance before it is fully closed. This resistance can be caused by an object that traverses the closing plane of the window, most often a body part of a person or animal within the vehicle. Without a system in place that can detect when a window has encountered a resistance before fully closing and that can take appropriate action to prevent the window from fully closing once the resistance is detected, serious injury or death can result from the continued closing of the window.

Window control systems have been designed that attempt to solve the above-mentioned problem. Some window control systems use sensors to detect the force caused by the resistance of window movement. However, sensors often require skilled installation that can be costly for vehicle manufacturers and consumers. Other systems have used light emitters and detectors to detect an obstruction by light blockage or reflection at the detector. However, lighting systems can be extremely sensitive to environmental and traffic lighting conditions, interference that can complicate the processing that must occur to determine whether or not an obstruction or a change of environmental lighting has occurred. Still further, other control systems rely on detecting window motor torque values. These systems, while effective, have disadvantages in that they can be difficult to implement, costly to manufacture, and can be susceptible to failed detections that may lead to serious injury. Additionally, the above systems may not be able to be implemented in all vehicle makes and models due to the particular sensors or other devices used in the window control system. Furthermore, the above systems may be susceptible to failure or inaccuracy depending on weather conditions, especially extremely cold conditions.

Therefore, it would be advantageous to provide a window control system that can universally be installed in all vehicle makes and models and that can provide anti-pinch features while eliminating the drawbacks of the current window control systems.

SUMMARY

The preferred embodiment of the invention provides methods for detecting and alleviating the pinching of an object in a window of a vehicle having a drive unit motor that opens and closes the window based upon current signals received from a manual window control switch. The method for detecting the pinching of an object includes determining a current threshold for the motor, determining the time required to close the window, monitoring the drive unit motor current draw during a window close operation, and determining that the current threshold has been reached before the time required to close the window has elapsed. The method for alleviating the pinching of objects includes determining a current threshold for the motor, determining the time required to close the window, monitoring the drive unit motor current draw during a window close operation, determining that the current threshold has been reached before the time required to close the window has elapsed, and positioning the window such that the motor current is less than the current threshold. The method can be programmed into a window control module that includes a microcontroller, memory, input means and output means. The module can be connected to a vehicle security system such that the security system controller and security system remote control can control the operation of the method.

Another embodiment of the invention provides methods for detecting and alleviating the pinching of an object in a window of a vehicle having a drive unit motor that opens and closes the window based upon current signals received from a manual window control switch. The method for detecting the pinching of an object includes determining a current threshold for the motor, determining the time required to close the window, which includes determining the positioning of the window and determining the time required to close the window based on the positioning of the window, monitoring the drive unit motor current draw during a window close operation, and determining that the current threshold has been reached before the time required to close the window has elapsed. The method for alleviating the pinching of objects includes determining a current threshold for the motor, determining the time required to close the window, which includes determining the positioning of the window and determining the time required to close the window based on the positioning of the window, monitoring the drive unit motor current draw during a window close operation, determining that the current threshold has been reached before the time required to close the window has elapsed, and positioning the window such that the motor current is less than the current threshold. The method can be programmed into a window control module that includes a microcontroller, memory, a drive unit current detecting circuit, a timer crystal, and a drive unit control relay. The module can be connected to a vehicle security system such that the security system controller and security system remote control can control the operation of the method.

Another embodiment of the invention provides methods for detecting and alleviating the pinching of an object in a window of a vehicle having a drive unit motor that opens and closes the window based upon current signals received from a manual window control switch. The method for detecting the pinching of an object includes determining a current threshold for the motor, determining the time required to close the window, which includes determining the positioning of the window and determining the time required to close the window based on the positioning of the window, monitoring the drive unit motor current draw during a window close operation, and determining that the current threshold has been reached before the time required to close the window has elapsed. The step of determining the positioning of the window includes the step of determining the positioning of the window includes the steps of designating a fully closed window position as a reference time value, determining the time required for the window to travel from the fully closed position to a fully open position, adding the time required for the window to travel from the fully closed position to a fully open position to the reference time value, determining the time required for the window to travel from a fully open position to a fully closed position, subtracting the time required for the window to travel from the fully open position to the fully closed position from the reference time value. The method can be programmed into a window control module that includes a microcontroller, memory, a drive unit current detecting circuit, a timer crystal, and a drive unit control relay. The module can be connected to a vehicle security system such that the security system controller and security system remote control can control the operation of the method.

The method for alleviating the pinching of objects includes determining a current threshold for the motor, determining the time required to close the window, which includes determining the positioning of the window and determining the time required to close the window based on the positioning of the window, monitoring the drive unit motor current draw during a window close operation, determining that the current threshold has been reached before the time required to close the window has elapsed, and positioning the window such that the motor current is less than the current threshold. The step of determining the positioning of the window includes the step of determining the positioning of the window includes the steps of designating a fully closed window position as a reference time value, determining the time required for the window to travel from the fully closed position to a fully open position, adding the time required for the window to travel from the fully closed position to a fully open position to the reference time value, determining the time required for the window to travel from a fully open position to a fully closed position, subtracting the time required for the window to travel from the fully open position to the fully closed position from the reference time value. The method can be programmed into a window control module that includes a microcontroller, memory, a drive unit current detecting circuit, a timer crystal, and a drive unit control relay. The module can be connected to a vehicle security system such that the security system controller and security system remote control can control the operation of the method.

Another embodiment of the invention provides methods for detecting and alleviating the pinching of an object in a window of a vehicle having a drive unit motor that opens and closes the window based upon current signals received from a manual window control switch. The method for detecting the pinching of an object includes determining a current threshold for the motor, determining the time required to close the window, which includes determining the positioning of the window, monitoring the drive unit motor current draw during a window close operation, and determining the time required to close the window based on the positioning of the window, and determining that the current threshold has been reached before the time required to close the window has elapsed. The step of determining the positioning of the window includes the step of determining the positioning of the window includes the steps of designating a fully closed window position as a reference time value, determining the time required for the window to travel from the fully closed position to a fully open position, adding the time required for the window to travel from the fully closed position to a fully open position to the reference time value, determining the time required for the window to travel from a fully open position to a fully closed position, subtracting the time required for the window to travel from the fully open position to the fully closed position from the reference time value. The method also contains a process for compensating for window control systems wherein a window opens and closes at different rates. The method can be programmed into a window control module that includes a microcontroller, memory, a drive unit current detecting circuit, a timer crystal, and a drive unit control relay. The module can be connected to a vehicle security system such that the security system controller and security system remote control can control the operation of the method.

The method for alleviating the pinching of objects includes determining a current threshold for the motor, determining the time required to close the window, which includes determining the positioning of the window, determining the time required to close the window based on the positioning of the window, monitoring a window close operation, determining that the current threshold has been reached before the time required to close the window has elapsed, and positioning the window such that the motor current is less than the current threshold. The step of determining the positioning of the window includes the step of determining the positioning of the window includes the steps of designating a fully closed window position as a reference time value, determining the time required for the window to travel from the fully closed position to a fully open position, adding the time required for the window to travel from the fully closed position to a fully open position to the reference time value, determining the time required for the window to travel from a fully open position to a fully closed position, subtracting the time required for the window to travel from the fully open position to the fully closed position from the reference time value. The method also contains a process for compensating for window control systems wherein a window opens and closes at different rates. The method can be programmed into a window control module that includes a microcontroller, memory, a drive unit current detecting circuit, a timer crystal, and a drive unit control relay. The module can be connected to a vehicle security system such that the security system controller and security system remote control can control the operation of the method.

These and other features and aspects of the embodiments of the invention will be better understood with reference to the following description, drawings, and appended claims.

DETAILED DESCRIPTION OF THE EMBODIMENTS

Reference will now be made in detail to several embodiments of the invention that are illustrated in the accompanying drawings. Wherever possible, same or similar reference numerals are used in the drawings and the description to refer to the same or like parts. The drawings are in a simplified form and are not to precise scale. For purposes of convenience and clarity only, directional terms, such as, top, bottom, left, right, up, down, over, above, below, beneath, rear, and front, may be used with respect to the accompanying drawings. These and similar directional terms should not be construed to limit the scope of the invention in any manner. Furthermore, in descriptions and in claims, "couple," "connect," and similar words with their inflectional morphemes do not necessarily import an immediate or direct connection, but include connections through mediate elements within their meanings.

Figure 1:
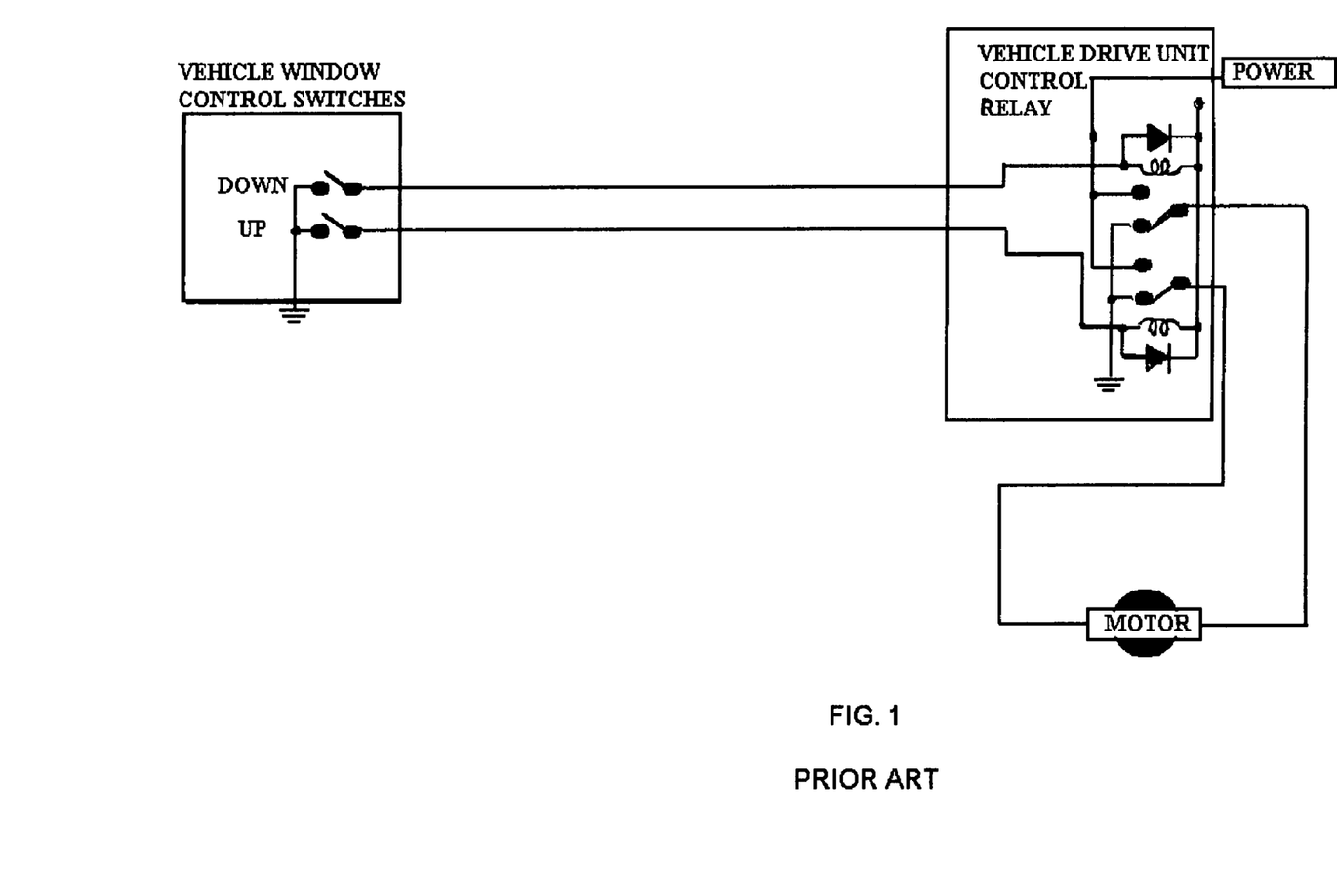
FIG. 1 shows a block diagram of a prior art vehicle window control system.

Referring more particularly to the drawings, FIG. 1 shows a block diagram of a prior art window control system for use in a vehicle. The typical window control system includes either two or four window control switches depending on the number of doors the vehicle contains. The system also includes a window motor connected to a vehicle drive unit control relay that opens and closes the window based upon current signals received from the window control switches. The drive unit can include a group of SPDT (Single Pole Double Throw) relays. These relays can be controlled by a programmable Integrated Circuit (IC) that reads and interprets window motor current while operating through PCB mounted current reduction hardware. The relays are generally directly wired to the window control switches.

Figure 2:
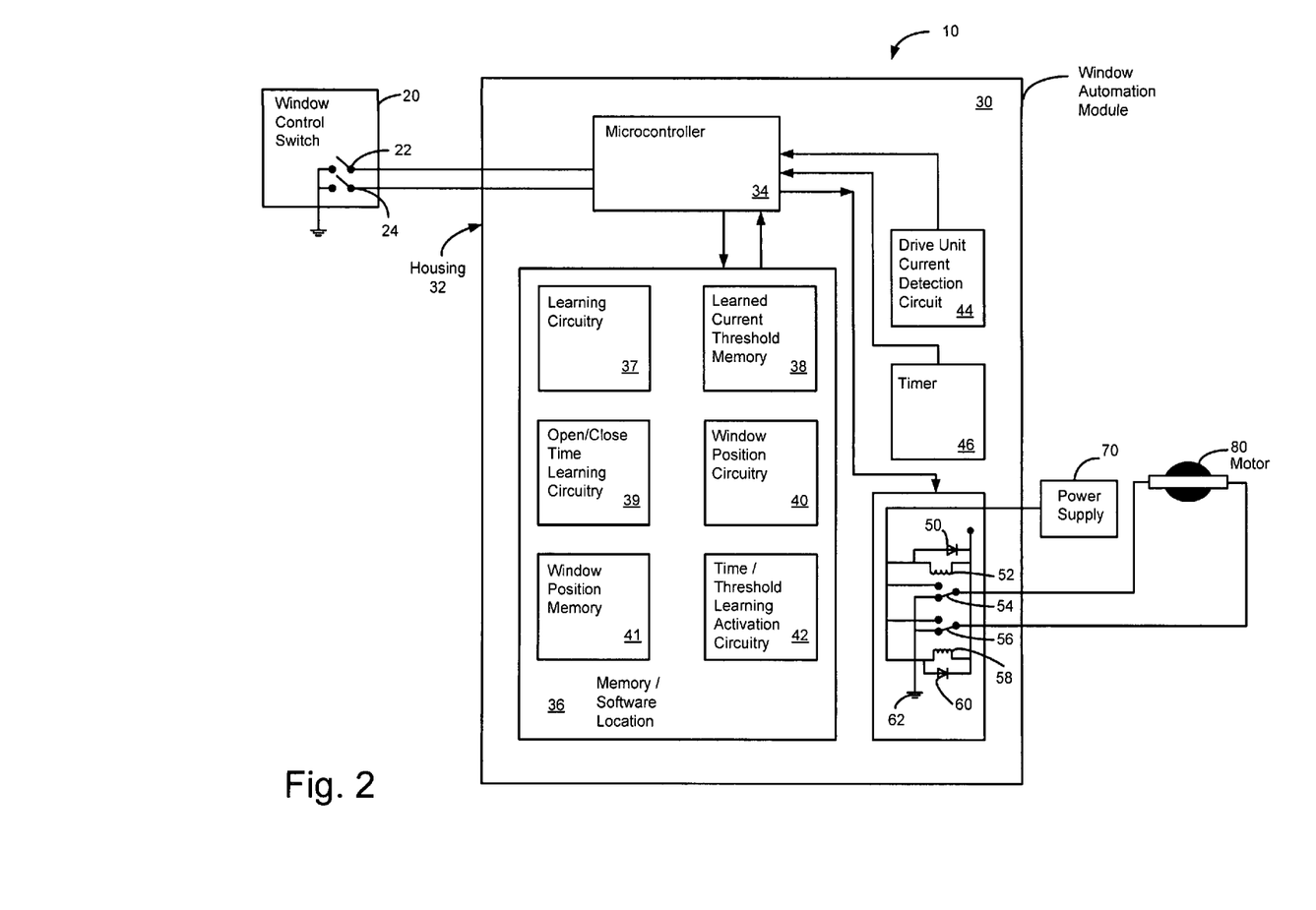
FIG. 2 shows a block diagram of vehicle window control system incorporating a window automation module containing the preferred embodiment of the anti-pinch window control system.

FIG. 2 shows a block diagram of vehicle window control system including the preferred embodiment of the anti-pinch window control system 10. System 10 includes at least one window control switch 20, a window automation module 30, a power supply 70, and a drive unit motor 80. Window control switch 20 includes a first switch 22 and a second switch 24. When switch 22 is closed, a signal is sent through module 30 to drive unit motor 80 to cause drive unit motor 80 to open a window (not shown). When switch 24 is closed, a signal is sent through module 30 to drive unit motor 80 to cause drive unit motor 80 to close the window. Module 30 preferably includes a housing 32. Housing 32 contains circuitry including a microcontroller 34, a memory and software location 36, a drive unit detecting circuit 44, a timer crystal 46, and a module drive control relay 48. Microcontroller 34 is preferably an integrated circuit including time arithmetic and time/threshold comparison software. Microcontroller 34 can also comprise other processors as recognized by one with ordinary skill in the art. Location 36 preferably includes a current threshold learning circuitry 37, learned current threshold memory 38, window open/close time learning circuitry 39, window position zero point reset circuitry 40, window position memory 41, and time and threshold learning activation circuitry 42. Control relay 48 includes a first diode 50 connected in parallel to a first inductor 52. Diode 50 and inductor 42 are connected in parallel to first relay 54. A second relay 56 is connected in parallel to first relay 54. A second inductor 58 and a second diode 60 are connected in parallel to second relay 56. Relays 54 and 56 are preferably SPDT (Single Pole Double Throw) relays. Relays 54 and 56 are coupled to ground and can be controlled by a programmable Integrated Circuit (IC) that reads and interprets window motor current while operating through printed circuit board (PCB) mounted current reduction hardware. Power supply 70 is connected to drive unit current detecting circuit 44 and control relay 48. Power supply 70 is preferably the vehicle's battery, but can also be provided from an independent battery source.

Because system 10 includes at least one window control switch 20, module 30 is directly wired switch 20. If system 10 includes a security system remote control (not shown), the remote control can send signals directly to module 30 via a wireless connection, preferably using radio frequency signals. If system 10 includes a security system controller (not shown), the controller can send signals wirelessly or module 30 can be hard wired to the controller. The security system controller can include various features including remote start and keyless entry capabilities. If module 30 is hard wired to the controller, module 30 will activate the window drive unit to either open or close the window based upon the detection of a ground input signal.

Figure 3:
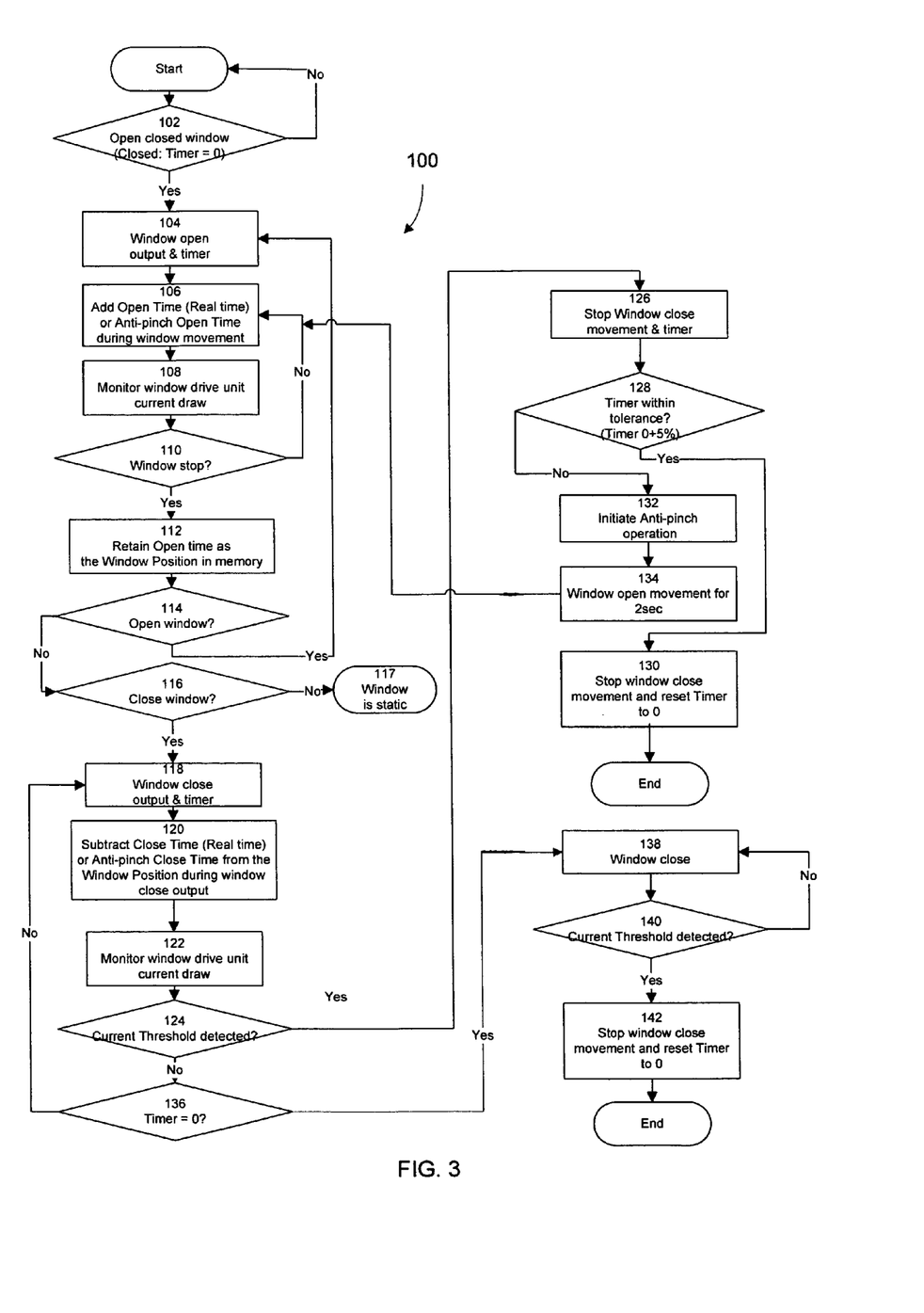
FIG. 3 shows a flow diagram of selected steps of the operation of an embodiment of the anti-pinch window control system.

FIG. 3 illustrates a flow diagram of selected steps of the operation of the preferred embodiment of the anti-pinch window control system including a method 100. Method 100 involves detecting the pinching of an object in a window of a vehicle having a drive unit motor that opens and closes a window based upon current signals received from either a window control switch, a security system remote control, or a security system controller. For illustration purposes, the operation of method 100 will be described with reference to a window control module such as that shown in FIG. 2, which can contain programming stored in memory that embodies method 100. Method 100 begins at step 102 by determining if a signal has been received by microcontroller 34 to open a closed window. If not, method 100 starts over. If a signal has been received, step 104 involves microcontroller 34 sending a window open signal to motor 80 and simultaneously sending a signal to start timer crystal 46. Step 106 next involves adding open time (real time) or anti-pinch open time (see FIG. 5) to the timer during the movement of the window. Whether open time or anti-pinch open time is used depends on whether or not the windows open faster than they close, open slower than they close, or open at the same rate as they close. If the windows open at the same rate as they close, open time (real time) will be used. If not, anti-pinch open time will be used, the calculation of which is discussed in the description related to FIG. 5.

Step 108 involves monitoring the window drive unit current draw during the window open operation. Step 110 next involves a determination of whether the window has stopped moving. If not, the process continues at step 106 to add time to the timer during the movement of the window. If the window has stopped moving, the time will be inputted in window position memory 41 as indicating the window position time. Step 112 next involves a determination as to whether an open window input signal has been received by microcontroller 34. If so, the method returns to step 104, with microcontroller 34 sending a window open signal to motor 80 and also sending a signal to start timer crystal 46 to add time to the previous time value. If not, step 116 next involves a determination as to whether a close window input signal has been received by microcontroller 34. If not, step 117 involves a determination that there is no window movement and that the window position is static. If a close window input signal has been received by microcontroller 34, step 118 involves microcontroller 34 sending a window close signal to motor 80 and sending a signal to start timer crystal 46.

Next, step 120 involves subtracting close time (real time) or anti-pinch close time (see FIG. 5) from the timer during window close output. Whether close time or anti-pinch close time is used depends on whether or not the windows close faster than they open, close slower than they open, or close at the same rate as they open. If the windows close at the same rate as they open, close time (real time) will be used. If not, anti-pinch close time will be used, the calculation of which is discussed in the description related to FIG. 5. Step 122 next involves monitoring the window drive unit motor current draw. This step can be performed by drive unit current detecting circuit 44. Step 124 next involves a determination as to whether the drive unit motor current threshold has been detected by detecting circuit 44. If so, step 126 involves microcontroller 34 sending a signal to motor 80 to stop the window close movement and also sending a signal to stop timer crystal 46. Next, step 128 involves microcontroller 34 making a determination if the time value is within a tolerance of 0-5% of the time required to fully close the window. This comparison can be made by the time arithmetic and time threshold comparison software located within microcontroller 34. If the time is within the tolerance, step 130 involves microcontroller 34 sending a signal to motor 80 to stop the window close movement and to also send a signal to window position zero point reset element 40 to reset the window position value timer to zero. If not, step 132 involves microcontroller 34 initiating the anti-pinch operation.

Step 134 next involves microcontroller 34 initiating a window open movement for two seconds. This process is accomplished by microcontroller 34 sending a signal to motor 80 to open the window, after which, method 100 continues at step 106 to either add open time or anti-pinch open time to the timer during the window open movement. If the drive unit motor current threshold has not been detected by detecting circuit 44 at step 124, method 100 proceeds to step 136. Step 136 involves microcontroller 34 making a determination as to whether the timer value is equal to zero. If it is not, method 100 repeats at step 118, wherein microcontroller sends a window open signal to motor 80 and sends a signal to start timer crystal 46. If the timer value is zero, step 138 involves a microcontroller 34 initiating a window close operation. Step 140 next involves microcontroller 34 making a determination as to whether the current threshold has been detected by drive unit current detecting circuit 44. If the current threshold has not been detected, method 100 repeats with step 138. If so, method 100 proceeds to step 142, which involves microcontroller 34 sending a signal to motor 80 to stop the window control movement and also sending a signal to window position zero point reset element to reset the timer. After this has occurred, method 100 is completed.

Figure 4:
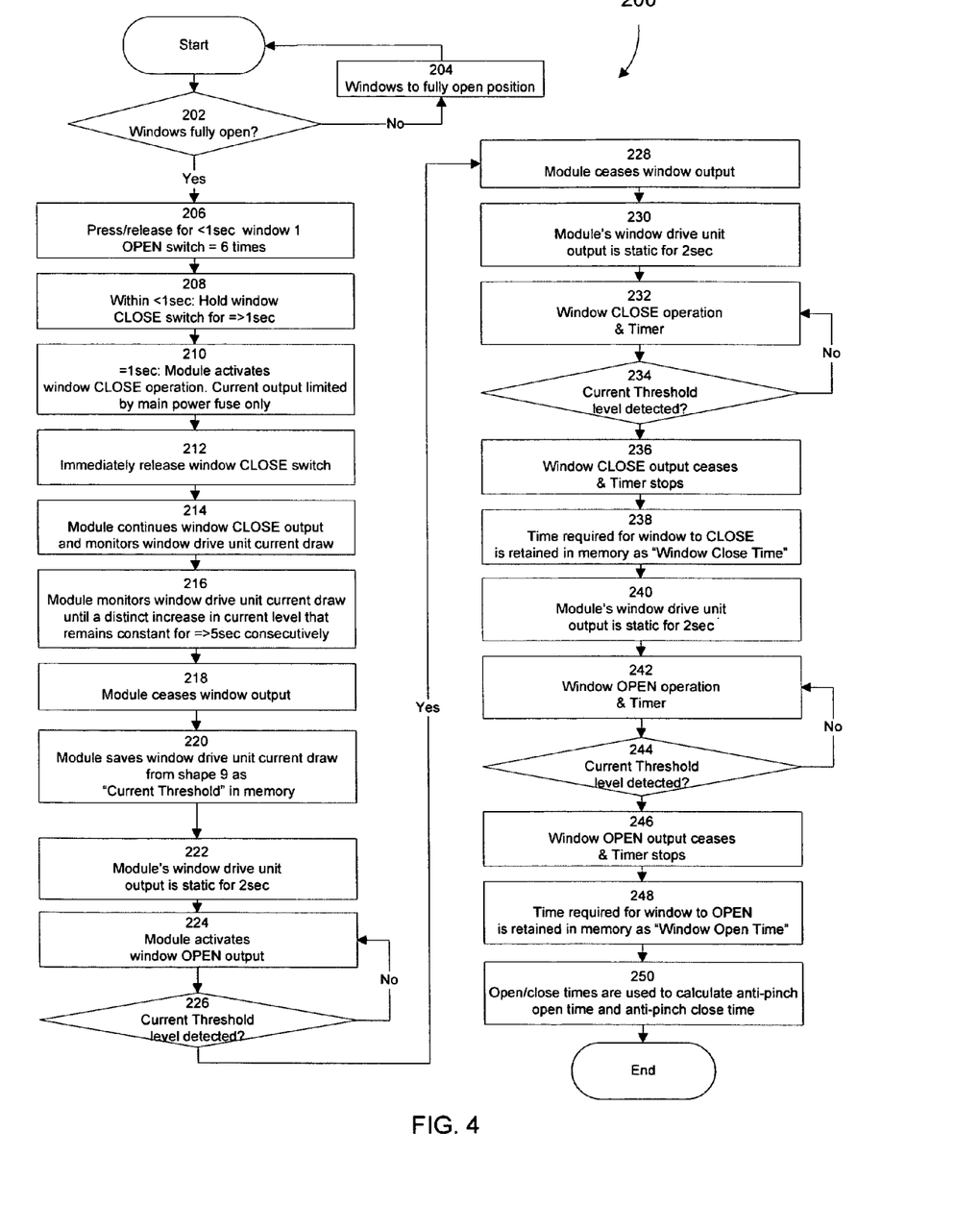
FIG. 4 shows a flow diagram of selected steps of a learn routine involved with the preferred embodiment of the anti-pinch window control system.

FIG. 4 shows flow diagram of selected steps of a learn routine method 200 involved with the preferred embodiment of the anti-pinch window control system. Learn routine 200 primarily serves to allow learning of certain values, such as current threshold, window open time, and window close time. After these values have been learned, they can be stored within module 30 for correct operation of method 100. Method 200 begins at step 202 by microcontroller 34 making a determination of whether or not the windows are fully open. This determination can be made from comparing values stored in the window position memory 41, namely the value stored when the windows are fully open and the value stored indicating the current window position. If the windows are not fully open, step 204 involves a user activating switch 20 that will cause microcontroller 34 sending an output to motor 80 to move windows to a fully open position. If the windows are fully open, method 200 proceeds to steps 206 and 208 to manually initiating the learn routine. Step 206 involves a user pressing and releasing the open position of window control switch 20 for less than a second, for six repetitions. Step 208 then involves a user, within less than a second after pressing and releasing the open position of window control switch 20 for less than a second for six repetitions, holding the close position of window control switch 20 for a time duration greater or equal to one second. After steps 206 and 208 have been successfully performed by a user, step 210 involves module 30 activating the window close-operation as the first step of learn routine 200. During this time, the current output of drive unit motor 80 will be limited only by the main power fuse.

After the window close operation as the first step of learn routine 200 is initiated, step 212 involves the user immediately releasing the window close switch. Step 214 next involves module 30 continuing the window close operation and monitoring the drive unit motor current draw. The monitoring of the motor current draw is performed by microcontroller 34 in connection with drive unit current detecting circuit 44. Step 216 involves monitoring the window drive unit current draw until a distinct increase in the current level that is constant for greater than or equal to five seconds. The detection of the distinct increase will be detected by detecting circuit 44, with the determination of the level remaining constant for greater than or equal to five seconds being performed by microcontroller 34. Upon this determination, method 200 proceeds to step 218 which involves microcontroller 34 sending a signal to motor 80 to cease the output to the window. Step 220 next involves microcontroller 34 saving the window drive unit current draw detected in step 216 as "Current Threshold" in learned current threshold memory 38. Step 222 next involves keeping the drive unit motor current output static for two seconds. Next, step 224 involves microcontroller 34 sending a signal to drive unit motor 80 to open the window. Next, step 226 involves microcontroller 34 making a determination as to whether the current threshold level has been detected by drive unit current detecting circuit 44. If the current threshold has not been detected, method 200 returns to step 224. If the current threshold has been detected, step 228 involves the microcontroller 34 sending a signal to cease the output of drive unit motor 80.

Step 230 next involves keeping output of drive unit motor 80 static for two seconds. Step 232 next involves microcontroller 34 sending a signal to motor 80 to close the window and also sending a signal to initiate timer crystal 46. Step 234 next involves microcontroller 34 making a determination as to whether the current threshold has been detected by drive unit current detecting circuit 44. If the current threshold has not been detected, method 200 repeats step 232. If the current threshold has been detected, method 200 proceeds to step 236, which involves microcontroller 34 sending a signal to drive unit motor 80 to cease the window close operation and also sending a signal to stop timer crystal 46. Step 238 next involves microcontroller 34 retaining the time required for the window to close in window position memory 41 as "Window Close Time". Step 240 then involves keeping the module's window drive unit output static for two seconds. Next, step 242 involves microcontroller 34 sending a signal to drive unit motor 80 to begin the window open operation and also sending a signal to start timer crystal 46. Step 244 involves microcontroller 34 making a determination as to whether or not the current threshold level is detected by drive unit current detecting circuit 44. If the current threshold level is not detected, method 200 repeats at step 242. If the current threshold level is detected, method 200 proceeds to step 246. Step 246 involves microcontroller 34 sending a signal to motor 80 to cease the window open movement and also sending a signal to stop timer crystal 46. Step 248 next involves microcontroller 34 retaining the time required for the window to open in window position memory 41 as "Window Open Time". Finally, step 250 involves microcontroller 34 using the window open time and the window close time to calculate the anti-pinch open time and the anti-pinch close time (see FIG. 5).

Figure 5:
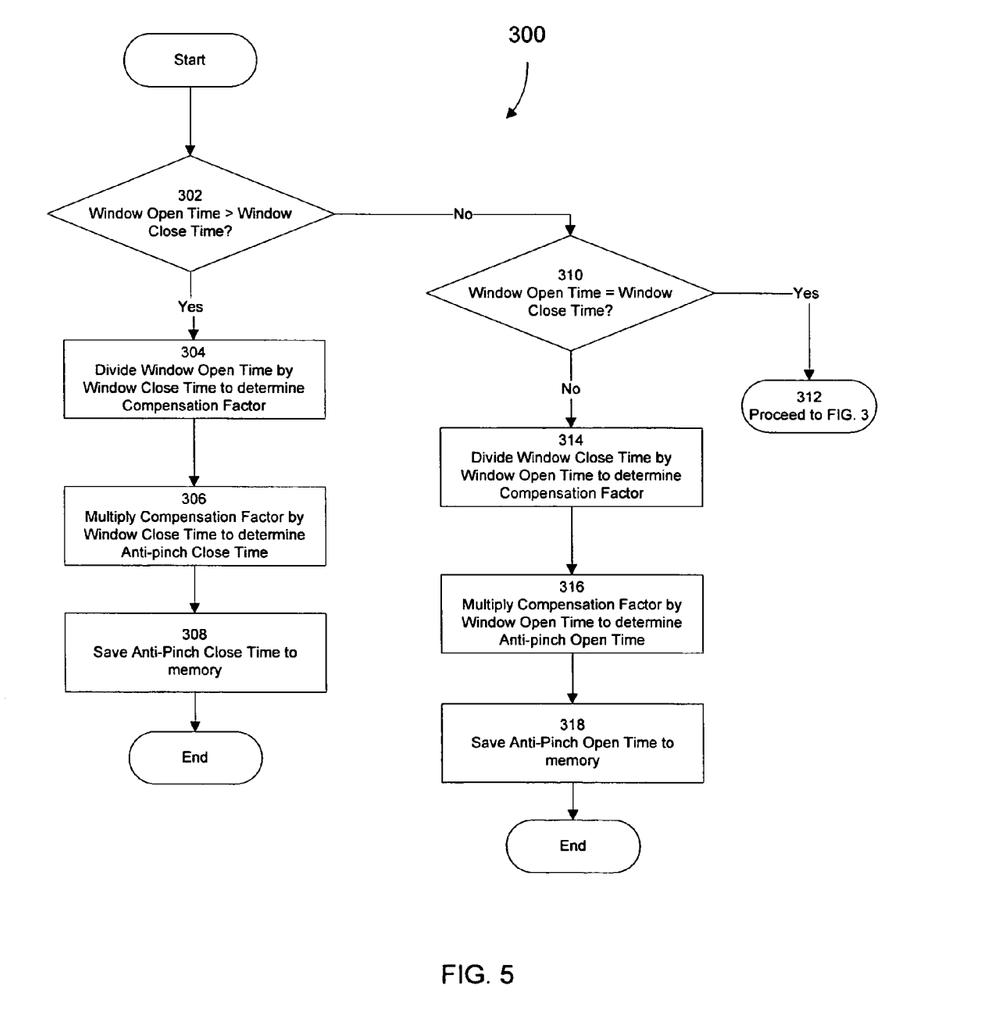
FIG. 5 shows a flow diagram of selected steps of determining compensation calculations in accordance with an embodiment of the anti-pinch window control system.

FIG. 5 shows a flow diagram of selected steps of a method 300 for determining compensation calculations in accordance with an embodiment of the anti-pinch window control system. Method 300 is used in vehicles having drive unit controls that either cause the windows to close at a slower rate than they open or cause the windows to open at a slower rate than they close. Typically, most vehicle windows open at a faster rate than they close, to try to eliminate the possibility of an object getting pinched by the window because of a fast closing action. Method 300 begins at step 302 by microcontroller 34 making a determination as to whether or not the window open time is greater than the window close time. This determination can be performed by comparing values stored within window position memory 41. If the window open time is greater than the window close time, step 304 involves microcontroller 34 dividing the window open time by the window close time to determine the compensation factor.

Next, step 306 involves microcontroller 34 multiplying the compensation factor by the window close time to determine the anti-pinch close time. Step 308 next involves microcontroller 34 saving the anti-pinch close time to window position memory 41. If the window open time is not greater than the window close time, method 300 proceeds to step 310, which involves microcontroller 34 making a determination as to whether or not the window open time is equal to the window close time. If it is, there is no compensation that needs to be made to either the window open time or the window close time. Thus, step 312 involves proceeding with method 100 shown in FIG. 3. If the window open time is less than the window close time, step 314 involves microcontroller 34 dividing the window close time by the window open time to determine the compensation factor. Next, step 316 involves microcontroller 34 multiplying the compensation factor by the window open time to determine the anti-pinch open time. Step 318 next involves microcontroller 34 saving the anti-pinch open time to window position memory 41.

This document describes the inventive devices and methods for detecting and alleviating the pinching of an object within the window of a vehicle. This is done for illustration purposes only. Neither the specific embodiments of the invention as a whole, nor those of its features limit the general principles underlying the invention. The invention is not limited to automotive uses. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

I claim:

1. A method for detecting the pinching of an object in a window of a vehicle having a drive unit motor that opens and closes the window based upon current signals received from a window control switch, a security system remote control, or a security system controller, comprising the steps of:
   a) determining a current threshold for the drive unit motor;
   b) determining the time required to close the window by determining the position of the window and determining the time required to close the window based on the position of the window, wherein the position of the window is determined by designating a fully closed window position as a reference time value; determining the time required for the window to travel from the fully closed position to a fully open position; adding the time required for the window to travel from the fully closed position to a fully open position to the reference time value; determining the time required for the window to travel from a fully open position to a fully closed position; and subtracting the time required for the window to travel from the fully open position to the fully closed position from the reference time value, creating a resulting reference time value wherein the value of the resulting reference time value will determine the position of the window;
   c) monitoring the drive unit motor current draw during a window close operation;
   d) determining that the current threshold has been reached before the time required to close the window has elapsed.

2. The method for detecting the pinching of an object in a window of a vehicle of claim 1 further comprising the step of dividing the time required for the window to travel from the fully closed position to a fully open position by the time required for the window to travel from a fully open position to a fully closed position to determine a position compensation factor for vehicles having windows that open at a faster rate than the windows close.

3. The method for detecting the pinching of an object in a window of a vehicle of claim 2, wherein the compensation factor is multiplied by the time required for the window to travel from the fully open position to a fully closed position for the purpose of determining a compensated window close time.

4. The method for detecting the pinching of an object in a window of a vehicle of claim 2, wherein the compensation factor is multiplied by the time required for the window to travel from the fully closed position to a fully open position for the purpose of determining a compensated window open time.

5. The method for detecting the pinching of an object in a window of a vehicle of claim 1, wherein the step of subtracting the time required for the window to travel from the fully open position to the fully closed position from the reference time value is replaced with the step of subtracting the actual window close time from the reference time value.

6. The method for detecting the pinching of an object in a window of a vehicle of claim 1 further comprising the step of dividing the time required for the window to travel from the fully open position to a fully closed position by the time required for the window to travel from a fully closed position to a fully open position to determine a position compensation factor for vehicles having windows that close at a faster rate than the windows open.

7. The method for detecting the pinching of an object in a window of a vehicle of claim 1, wherein the step of adding the time required for the window to travel from the fully closed position to a fully open position to the reference time value is replaced with the step of adding the compensated window open time to the reference time value.

8. The method for detecting the pinching of an object in a window of a vehicle of claim 1 further comprising the step of resetting the resulting reference value to clear any discrepancies during normal operation of the window control system.

9. The method for detecting the pinching of an object in a window of a vehicle of claim 8, wherein the step of resetting the resulting reference value to clear any discrepancies during normal operation of the window control system occurs each time the window reaches a fully closed position without detecting the pinching of an object.

10. The method for detecting the pinching of an object in a window of a vehicle of claim 8, wherein the step of resetting the resulting reference value to clear any discrepancies during normal operation of the window control system occurs each time the window control switch provides a continuous close window input and the window reaches a fully closed position without detecting the pinching of an object.

11. The method for detecting the pinching of an object in a window of a vehicle of claim 8, wherein the step of resetting the resulting reference value to clear any discrepancies during normal operation of the window control system occurs after each time the resulting reference value reaches zero before the window reaches a fully closed position and the window continues closing until the window reaches a fully closed position.

12. A method for detecting the pinching of an object in a window of a vehicle having a drive unit motor that opens and closes the window based upon current signals received from a window control switch, a security system remote control, or a security system controller, comprising the steps of:
   a) determining a current threshold for the drive unit motor;
   b) determining the time required to close the window;
   c) monitoring the drive unit motor current draw during a window close operation; and
   d) determining that the current threshold has been reached before the time required to close the window has elapsed;
   e) opening the window for a predetermined time interval such that the motor current does not equal the current threshold;
   f) pausing the window close operation for a predetermined time interval;
   g) determining if the current threshold has been reached a subsequent time before the time required to close the window has elapsed;
   h) opening the window for a predetermined time interval such that the drive unit motor current draw does not equal the current threshold;
   i) pausing the window close operation for a predetermined time interval; and
   j) resuming the window close operation.

13. The method for detecting the pinching of an object in a window of a vehicle of claim 12, wherein the steps repeat for a maximum of three repetitions.

14. The method for detecting the pinching of an object in a window of a vehicle of claim 12, wherein the steps repeat until the drive unit motor current reaches the current threshold after ninety-five percent of the time required to close the window has elapsed.

15. A method for alleviating the pinching of an object in a window of a vehicle having a drive unit motor that opens and closes the window based upon current signals received from a window control switch, a security system remote control, or a security system controller, comprising the steps of:
   a) determining a current threshold for the drive unit motor;
   b) determining the time required to close the window, the method further comprising:
      (i) designating a fully closed window position as a reference time value;
      (ii) determining the time required for the window to travel from the fully closed position to a fully open position;
      (iii) adding the time required for the window to travel from the fully closed position to a fully open position to the reference time value;
      (iv) determining the time required for the window to travel from a fully open position to a fully closed position;
      (v) subtracting the time required for the window to travel from the fully open position to the fully closed position from the reference time value, creating a resulting reference time value, wherein the value of the resulting reference time value will determine if the window is in an open, fully open, closed, or fully closed position;
      (ii) determining the time required to close the window based on the position of the window; and
      (v) determining the position of the window;
   c) monitoring the drive unit motor current draw during a window close operation;
   d) determining that the drive unit motor current threshold has been reached before the time required to close the window has elapsed; and
   e) positioning the window such that the drive unit motor current is less than the current threshold.

16. The method for alleviating the pinching of an object in a window of a vehicle of claim 15 further comprising the step of dividing the time required for the window to travel from the fully closed position to a fully open position by the time required for the window to travel from a fully open position to a fully closed position to determine a position compensation factor for vehicles having windows that open at a faster rate than the windows close.

17. The method for alleviating the pinching of an object in a window of a vehicle of claim 16, wherein the compensation factor is multiplied by the time required for the window to travel from the fully open position to a fully closed position for the purpose of determining a compensated window close time.

18. The method for alleviating the pinching of an object in a window of a vehicle of claim 16, wherein the compensation factor is multiplied by the time required for the window to travel from the fully closed position to a fully open position for the purpose of determining a compensated window open time.

19. The method for alleviating the pinching of an object in a window of a vehicle of claim 15, wherein the step of subtracting the time required for the window to travel from the fully open position to the fully closed position from the reference time value is replaced with the step of subtracting the compensated window close time from the reference time value.

20. The method for alleviating the pinching of an object in a window of a vehicle of claim 15 further comprising the step of dividing the time required for the window to travel from the fully open position to a fully closed position by the time required for the window to travel from a fully closed position to a fully open position to determine a position compensation factor for vehicles having windows that close at a faster rate than the windows open.

21. The method for alleviating the pinching of an object in a window of a vehicle of claim 15, wherein the step of adding the time required for the window to travel from the fully closed position to a fully open position to the reference time value is replaced with the step of adding the actual window open time to the reference time value.

22. The method for alleviating the pinching of an object in a window of a vehicle of claim 15, wherein the step of positioning the window such that the motor current is less than the current threshold is replaced with the step of positioning the window such that a time value is added to the reference time value.

23. The method for alleviating the pinching of an object in a window of a vehicle of claim 22 further comprising the steps of:
   a) maintaining the position of the window such that a time value is added to the reference time value for a predetermined time interval; and
   b) allowing the window to reach the fully closed position after maintaining the position of the window such that a time value is added to the reference time value for a predetermined time interval.

24. The method for alleviating the pinching of an object in a window of a vehicle of claim 15 further comprising the step of resetting the resulting reference value to clear any discrepancies during normal operation of the window control system.

25. The method for alleviating the pinching of an object in a window of a vehicle of claim 24, wherein the step of resetting the resulting reference value to clear any discrepancies during normal operation of the window control system occurs each time the window reaches a fully closed position without detecting the pinching of an object.

26. The method for alleviating the pinching of an object in a window of a vehicle of claim 24, wherein the step of resetting the resulting reference value to clear any discrepancies during normal operation of the window control system occurs each time the window control switch provides a continuous close window input and the window reaches a fully closed position without detecting the pinching of an object.

27. The method for alleviating the pinching of an object in a window of a vehicle of claim 24, wherein the step of resetting the resulting reference value to clear any discrepancies during normal operation of the window control system occurs after each time the resulting reference value reaches zero before the window reaches a fully closed position and the window continues closing until the window reaches a fully closed position.

28. A method for alleviating the pinching of an object in a window of a vehicle having a drive unit motor that opens and closes the window based upon current signals received from a window control switch, a security system remote control, or a security system controller, comprising:
   a) determining a current threshold for the drive unit motor;
   b) determining the time required to close the window;
   c) monitoring the drive unit motor current draw during a window close operation;
   d) determining that the drive unit motor current threshold has been reached before the time required to close the window has elapsed;
   e) positioning the window such that the drive unit motor current is less than the current threshold;
   f) pausing the window close operation for a predetermined time interval; and
   g) resuming the window close operation;
   h) determining if the current threshold has been reached a subsequent time before ninety-five percent of the time required to close the window has elapsed;
   i) opening the window for a predetermined time interval such that the motor current does not equal the current threshold;
   j) pausing the window close operation for a predetermined time interval; and
   k) resuming the window close operation.

29. The method for alleviating the pinching of an object in a window of a vehicle of claim 28, wherein the steps repeat for a maximum of three repetitions.

30. The method for alleviating the pinching of an object in a window of a vehicle of claim 28, wherein the steps repeat until the window reaches the current threshold after ninety-five percent of the time required to close the window has elapsed.

31. A method for detecting the pinching of an object in a window of a vehicle having a drive unit motor that opens and closes the window based upon current signals received from a window control switch, security system remote control, or a security system controller, comprising the steps of:
   a) determining a current threshold for the drive unit motor;
   b) determining the time required to close the window by determining the position of the window and determining the time required to close the window based on the position of the window, wherein said step for determining the position of the window further comprises:
      (i) designating a fully closed window position as a reference time value;
      (ii) determining the time required for the window to travel from the fully closed position to a fully open position;
      (iii) adding the time required for the window to travel from the fully closed position to a fully open position to the reference time value;
      (iv) determining the time required for the window to travel from a fully open position to a fully closed position; and
      (v) subtracting the time required for the window to travel from the fully open position to the fully closed position from the reference time value, creating a resulting reference time value wherein the value of the resulting reference time value will determine if the window is in an open, fully open, closed, or fully closed position;
   c) monitoring the drive unit motor current draw during a window close operation; and
   d) determining if the current threshold has been reached before ninety-five percent of the time required to close the window has elapsed.

32. A method for alleviating the pinching of an object in a window of a vehicle having a drive unit motor that opens and closes the window based upon current signals received from a window control switch, comprising:
   a) determining a current threshold for the drive unit motor;
   b) determining the time required to close the window, including the steps of determining the position of the window and determining the time required to close the window based on the position of the window;
   c) monitoring the drive unit motor current draw during a window close operation;
   d) determining if the current threshold has been reached before ninety-five percent of the time required to close the window has elapsed;
   e) positioning the window such that the drive unit motor current is less than the current threshold, wherein determining the position of the window further comprises:
      i) designating a fully closed window position as a reference time value;
      ii) determining the time required for the window to travel from the fully closed position to a fully open position;
      (iii) adding the time required for the window to travel from the fully closed position to a fully open position to the reference time value;
      (iv) determining the time required for the window to travel from a fully open position to a fully closed position; and
      (v) subtracting the time required for the window to travel from the fully open position to the fully closed position from the reference time value, creating a resulting reference time value, wherein the value of the resulting reference time value will determine if the window is in an open, fully open, closed, or fully closed position.

33. A window control module for detecting the pinching of an object in a window of a vehicle having a drive unit motor that opens and closes the window based upon current signals received from a window control switch, security system remote control, or security system controller, comprising:

a) a housing;
b) a microcontroller disposed within the housing;
c) a means for receiving input operatively coupled to the microcontroller;
d) a means for transmitting output operatively coupled to the microcontroller; and
e) at least one means for storing memory, the at least one means for storing memory further comprising:
  (1) anti-pinch programming to determine:
    (i) a current threshold for the motor,
    (ii) the time required to close the window,
    (iii) monitor a window close operation,
    (iv) determine that the current threshold has been reached before the time required to close the window has elapsed,
    (v) determine the position of the window and determine the time required to close the window based on the position of the window; and
  (2) programming to designate a fully closed window position as a reference time value, determine the time required for the window to travel from the fully closed position to a fully open position, add the time required for the window to travel from the fully closed position to a fully open position to the reference time value, determine the time required for the window to travel from a fully open position to a fully closed position, and subtract the time required for the window to travel from the fully open position to the fully closed position from the reference time value, creating a resulting reference time value wherein the value of the resulting reference time value will determine if the window is in an open, fully open, closed, or fully closed position.

34. A window control module for alleviating the pinching of an object in a window of a vehicle having a drive unit motor that opens and closes the window based upon current signals received from a window control switch, a security system remote control, or a security system controller, comprising:

a) a housing;
b) a microcontroller disposed within the housing;
c) a means for receiving input operatively coupled to the microcontroller;
d) a means for transmitting output operatively coupled to the microcontroller; and
e) at least one means for storing memory, the at least one means for storing memory containing anti-pinch programming to determine a current threshold for the drive unit motor, determine the time required to close the window, monitor a window close operation, determine that the current threshold has been reached before the time required to close the window has elapsed, position the window such that the motor current is less than the current threshold, determine the position of the window and the time required to close the window based on the position of the window, designate a fully closed window position as a reference time value, determine the time required for the window to travel from the fully closed position to a fully open position, add the time required for the window to travel from the fully closed position to a fully open position to the reference time value, determine the time required for the window to travel from a fully open position to a fully closed position, and subtract the time required for the window to travel from the fully open position to the fully closed position from the reference time value, creating a resulting reference time value wherein the value of the resulting reference time value will determine if the window is in an open, fully open, closed, or fully closed position.

35. The window control module for detecting the pinching of an object in a window of a vehicle of claim 34 further comprising a switch coupled to the housing and operatively connected to the microcontroller for turning the anti-pinch programming on and off.

* * * * *